Aug. 27, 1940.　　　　W. H. KITTO　　　　2,212,663

REFRIGERATION

Filed Dec. 23, 1937

INVENTOR
*William H. Kitto*

BY

*Harry S. Dumass*

ATTORNEY

Patented Aug. 27, 1940

2,212,663

UNITED STATES PATENT OFFICE 2,212,663

REFRIGERATION

William H. Kitto, Canton, Ohio, assignor to The Hoover Company, North Canton, Ohio, a corporation of Ohio Application December 23, 1937, Serial No. 181,282

15 Claims. (Cl. 62—5)

My invention relates to refrigerating systems of the type involving a power-driven means to circulate fluids through the system. In known systems of this type, motor-driven fans have been proposed as a means for circulating the fluids. Due to the pressure prevailing in the system and to the corrosive action of the fluids in the system, it is highly desirable to place the motor winding outside the refrigerating system proper. One method of doing this consists in driving the circulating fan by means of a squirrel cage induction motor rotor rotating in a thin metal shell capable of withstanding the pressure prevailing in the system. The single phase stator winding and shaded field poles are mounted outside the shell; therefore, there is merely a magnetic connection between the electrical windings which are connected to suitable power supply and those portions of the motor which are exposed to the fluids in the system.

Motors of the type just described operate very satisfactorily; however, they possess the disadvantage of an inherently low starting torque. Customarily motors of this type are required to start cold when applied to refrigeration systems; therefore, in addition to the normal starting losses there is the drag imposed by cold bearings and cold lubricant. It is clear from the statements above that a single phase shaded pole type induction motor having a single winding must be capable of carrying a relatively heavy starting current to produce reasonable starting torque whereby the winding must be designed to carry safely currents greatly in excess of those necessary for normal running conditions with resulting excess heating of the motor and inefficiency of the apparatus as a whole.

It is an object of this invention to overcome the difficulties enumerated above by the provision of a motor of the type described having a low wattage running winding combined with a high wattage starting winding. More specifically, it is an object of this invention to provide means whereby the high wattage starting winding is conditioned for operation whenever the refrigerating system is de-energized, and is de-energized shortly after the circulating motor reaches normal operating speed.

It is a further object of this invention to provide a circulating motor for refrigerating systems which will possess high starting torque and high normal operating efficiency.

It is a further object of this invention to provide a refrigerating system circulator motor having a running winding controlled by refrigeration demands and a starting winding which is controlled by a condition of the refrigerating system.

It is a further object of this invention to provide a refrigerating system of the type utilizing a circulator motor having a starting winding and a running winding wherein both windings are controlled in response to demands for refrigeration and the starting winding is further controlled in response to the condition of the circulator.

It is a further object of this invention to provide a refrigerating system having a circulator motor of the type provided with a starting winding wherein the starting winding is conditioned to be energized by a normal control mechanism immediately operation of the refrigerating system is discontinued.

Other and further objects of the invention will become apparent as the description proceeds when taken in connection with the accompanying drawing in which.

Figure 1:
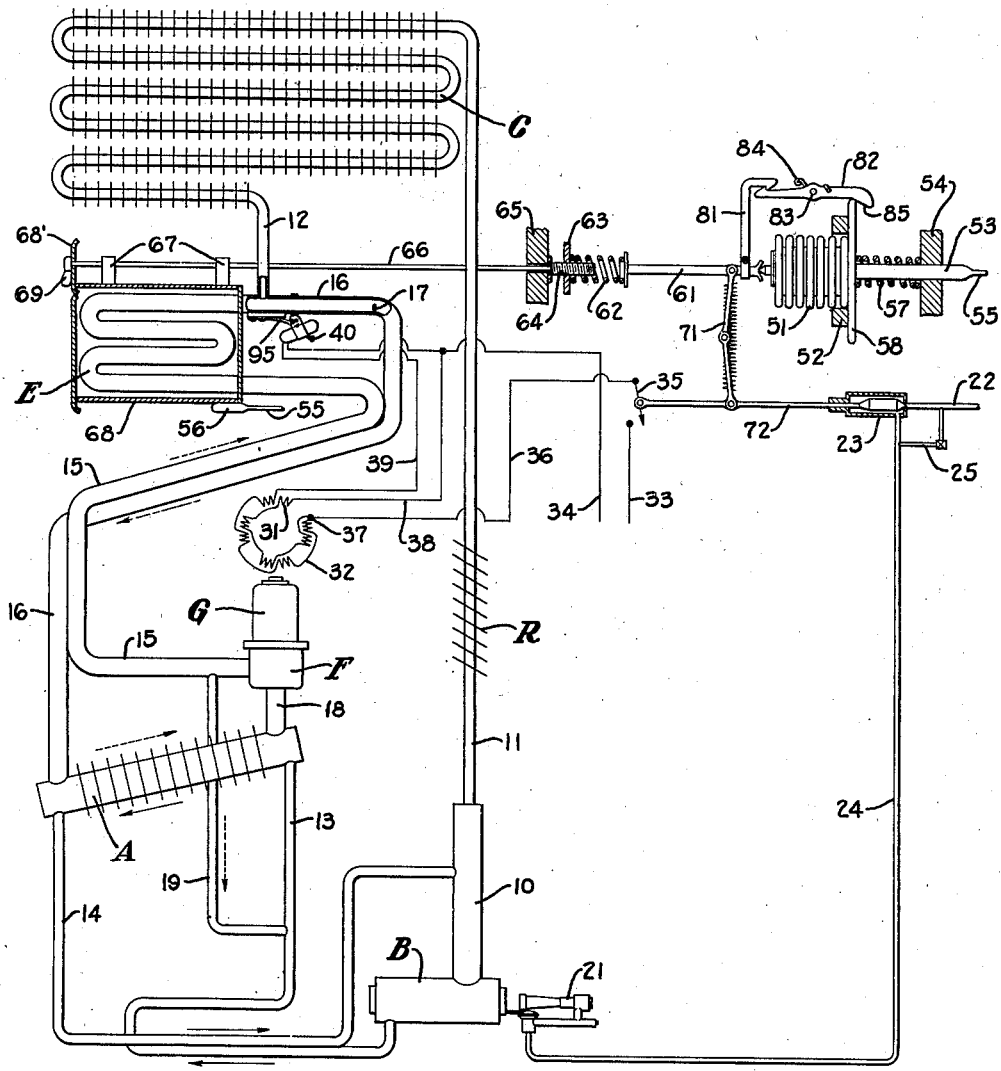
Figure 1 illustrates diagrammatically a refrigerating system and a control mechanism therefor embodying my invention.

Referring now to the drawing and first to Figure 1 thereof, it will be seen that I have disclosed a continuous three-fluid absorption refrigerating system comprising a boiler B, a rectifier R, a condenser C, an evaporator E, an absorber A, and a pressure equalizing medium circulating fan F which is driven by an electrical motor G.

It is to be understood that the elements just described are illustrated diagrammatically only and that any desired specific constructional forms may be used.

The elements just described are interconnected by various conduits to form a plurality of local gas and liquid circuits. The boiler B contains a solution of refrigerant in an absorbent, preferably ammonia and water, which liberates refrigerant vapor whenever heat is applied to the boiler B. Refrigerant vapor liberated in the boiler B passes upwardly through an analyzer 10 and a conduit 11 to a condenser C which is preferably of the air-cooled type. The conduit 11 contains an air-cooled rectifier R whereby absorption liquid vapor carried into conduit 11 with the refrigerant vapor is caused to condense and to flow backwardly through conduit 11 into the boiler B. The refrigerant vapor is liquefied in the condenser C by heat exchange with ambient air and is discharged therefrom through a conduit 12 into a conduit 16 forming a continuation of the upper portion of the evaporator E.

The weak liquor is conducted from the boiler B into the upper portion of an inclined air-cooled absorber A by a conduit 13. Strong liquor is formed in the absorber A in a manner to be described hereinafter and collects in the lower end thereof from which it is returned to the analyzer 10 through a conduit 14 in heat exchange relationship with the conduit 13.

The evaporator E and absorber A are suitably interconnected to form a pressure equalizing medium circuit. The pressure equalizing medium is preferably a dense inert gas such as nitrogen. The inert gas is placed under pressure by the fan F and is conveyed therefrom into the lower end of the evaporator E by means of the conduit 15. The inert gas flows through the evaporator E in counterflow relationship with liquid refrigerant flowing therethrough by gravity whereby the liquid evaporates into the gas stream to produce useful refrigeration. The mixture of inert gas and refrigerant vapor formed in the evaporator is conveyed therefrom to the lower end of the absorber A by means of the conduit 16 which is in heat exchange relationship with the conduit 15 previously described. A small liquid dam 17 is mounted in the conduit 16 adjacent its point of connection to the evaporator E whereby to prevent liquid refrigerant from flowing downwardly into the absorber. The mixture of inert gas and refrigerant vapor flows upwardly through the air-cooled absorber A in counterflow relationship with the stream of absorption liquid flowing downwardly therethrough. The liquid and gases are brought into intimate contact in the absorber A whereby the refrigerant vapor is separated from the pressure equalizing medium by absorption in the liquid. The liquid collects in the lower end of the absorber and is returned to the boiler in a manner previously described. The inert gas exits from the upper end of the absorber through a conduit 18 which conveys it to the suction inlet of the circulating fan F.

A small bleed conduit 19 is connected to convey inert gas from the discharge side of the fan F into the conduit 13 at a point below the liquid level in the boiler system whereby the weak solution is elevated into the upper end of the absorber by gas-lift action.

The boiler B is heated by a suitable gas burner 21 which is provided with the usual safety cut-off protective device. Gas is supplied from a suitable source through a conduit 22, gas valve 23, and a conduit 24 connecting the gas valve and the burner. A suitable by-pass 25 is provided around the valve 23 whereby to maintain a small pilot flame on the burner 21 during periods when there is no demand for refrigeration. If desired, the conduit 25 could connect directly to a small constant pilot burner provided with a suitable safety cut-off protective device.

The motor G for driving the circulating fan F is of a known type consisting of an induction rotor mounted within a hermetically sealed shell and connected to rotate the fan. The motor G is provided with a running winding 31 and a starting winding 32 which are illustrated diagrammatically herein. Power is supplied from a suitable source of supply through a pair of supply wires 33 and 34. The wire 33 connects directly to a control switch 35 which is connected by means of a wire 36 to the windings 31 and 32 at 37. The running winding 31 is connected by a wire 38 directly to the line wire 34. The starting winding 32 is connected by means of a wire 39 to a starting winding control switch 40 to be more fully described hereinafter. The switch 40 is also directly connected to the line wire 34.

The normal operation of the motor G and the burner 21 is regulated by a refrigerating control mechanism diagrammatically illustrated in Figure 1 and now to be described. An expansible bellows 51 is slidably mounted in a suitable fixedly mounted guide ring 52. The bellows is provided with an elongated conduit 53 which is slidably received in suitable fixed support 54. The conduit 53 communicates with a capillary tube 55 which terminates in a bulb 56 positioned to be responsive to temperature conditions in the evaporator E. The elements 51, 53, 55 and 56 are charged with a suitable fluid which will expand and contract in response to small temperature changes whereby temperature changes in the evaporator E will be reflected by an expansion or contraction of the bellows 51.

The conduit 53 extends through a stiff spring 57 interposed between the fixed support 54 and a large plate 58. The plate 58 abuts the bellows guide ring 52 and the end of the bellows 51 within the guide ring. The free end of the bellows 51 abuts an actuating shaft 61 which is urged against the bellows 51 by means of a temperature range adjusting spring 62. The adjusting spring 62 abuts an adjusting nut 63 which is carried by an adjusting screw 64. The adjusting screw 64 abuts an immovable member 65 whereby it is prevented from shifting to the left as viewed in Figure 1 under the bias of the spring 62.

A small shaft 66 is connected directly to the adjusting screw 64 and is journalled in the fixed support 65. The shaft 66 is also suitably journalled in journal blocks 67 formed on the top of a casing 68 enclosing the evaporator E and it extends through a control panel 68' extending upwardly at the front of the evaporator casing. A suitable adjusting knob 69 is mounted on the end of the shaft 66 adjacent the panel 68'. Rotation of the knob 69 adjusts the compression of the spring 62 against which the bellows 51 acts and thereby adjusts the temperature range of the bellows 51.

The actuating shaft 61 is connected to a suitable toggle mechanism indicated generally at 71 which is connected to a shaft 72 interconnecting the gas valve 23 and the electric switch 35 for simultaneous operation. The arrangement is such that an expansive movement of the bellows 51, corresponding to a demand for refrigeration in response to an elevated evaporator temperature, shifts the shaft 61 to the left, as viewed in Figure 1, whereby the shaft 72 is also caused to move to the left and to open the gas valve 23 and close the switch 35. When the evaporator reaches the temperature for which the mechanism is adjusted, the bellows contracts and permits the spring 62 to shift the shaft 61 to the right, as viewed in Figure 1, whereupon the shaft 72 shifts to the right closing the valve 23 and opening the switch 35.

The mechanism just described is provided with a suitable defrosting device which comprises a latch arm 81 rigidly mounted on the shaft 61 and constructed to latch with a lock-out arm 82 pivotally mounted at 83. A small torsion spring 84 urges the arm 82 in a clockwise direction, as viewed in Figure 1. The arm 82 is provided with a cam surface 85 which is positioned to abut the plate 58 and to determine the limit of rotation of the arm 82 in a clockwise direction.

Defrosting is accomplished by rotating the knob 69 to the defrost position, which is suitably indicated on the panel 68', and then returning the knob 69 to any normal controlling position, also as suitably indicated on the panel 68'. Movement of the knob 69 to the defrosting position causes the nut 63 to be advanced to such an extent that the compression of the spring 62 is sufficient to force the arm 61 to the right against the pressure of the bellows 51 a distance sufficient to cause the arms 81 and 82 to latch. Once the arms 81 and 82 are latched, movement of the nut 63 to the left, as viewed in Figure 1, will have no effect on the control mechanism other than to relieve the compression of the spring 62.

When the arms 81 and 82 are in latched position the gas valve 23 is closed and the switch 35 is open whereby the refrigerating system is inoperative and the evaporator begins to warm up. As the evaporator temperature increases the bellows 51 shifts the plate 58 to the right, as viewed in Figure 1, against the compression of the stiff spring 57. Movement of the plate 58 to the right causes the arm 82 to swing in a counter-clockwise direction due to the engagement between the plate 58 and the cam surface 85. As the arm 82 swings in a counter-clockwise direction, it releases the engagement between itself and the arm 81 and the stiff spring 57 immediately forces the apparatus to return to normal operation. The apparatus is so calibrated that the latching engagement between the arms 81 and 82 will not be broken until such time as the evaporator shall have reached a temperature sufficiently high to melt all frost therefrom.

Figure 2:
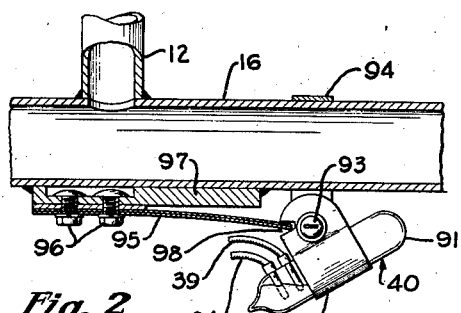
Figure 2 is a detailed view of part of the control mechanism and drawn to an enlarged scale.

Referring now to Figures 1 and 2, it will be seen that the switch 40 comprises a mercury switch bulb 91 carried by a supporting bracket 92 which is pivotally mounted at 93 in a bracket 94 attached in any suitable manner to the conduit 16. A suitable bi-metallic thermostat 95 is rigidly attached at 96 to a conducting plate 97 which is rigidly attached to the conduit 16 directly beneath the point at which the conduit 12 opens into the conduit 16. The free end of the bimetallic thermostat 95 is engaged in a suitable notch 98 formed in the pivotally mounted socket 92.

The bimetallic thermostat 95 is positioned to be affected directly and rapidly by the temperature of that portion of the conduit 16 directly beneath the liquid refrigerant inlet 12. When the refrigerating system is operating the conduit 16 is very cold due to the refrigeration produced therein and to the cold inert gas refrigerant vapor mixture flowing therethrough. The thermostat 95 flexes upwardly, as viewed in Figure 2, to shift the switch bulb 91 to the open circuit position when the conduit 16 is cold.

A small amount of liquid refrigerant will be discharged through the conduit 12 after the normal control mechanism has operated to de-energize the burner 21 and the motor G whereby that portion of the conduit 16 in thermal relationship with the thermostat 95 will rapidly approach the temperature of the liquid refrigerant which is slightly above that of the surrounding air. An elevated temperature at the junction of the conduits 12 and 16 causes the thermostat 95 to flex downwardly to shift the switch bulb 91 to the circuit closing position.

I have described my invention as applied to a continuous three-fluid refrigerating system but this is to be taken as illustrative only and not in a limiting sense. My invention is equally applicable to other types of systems.

It will be seen that I have devised a control mechanism which insures maximum starting torque for a refrigerator circulator motor with maximum running efficiency. In operation the starting winding is de-energized but it is conditioned for energization by the normal mechanism very shortly after the circulator motor is de-energized and is energized by the normal control mechanism simultaneously with the starting winding. The starting winding control is interconnected with the normal control mechanism but it does not effect adversely normal control of the refrigerator or defrosting of the evaporator.

While I have illustrated and described a single embodiment of my invention it is to be understood that it is capable of expression in other constructional forms and variations without departing from the spirit of the invention or the scope of the appended claims.

I claim:

1. Refrigerating apparatus including a pressure equalizing medium circuit, an evaporator in said circuit, a motor-driven circulator in said circuit, said motor-driven circulator being provided with independent starting and running windings, means for supplying warm liquid refrigerant to said evaporator, means responsive to demands for refrigeration operative to energize the starting and running windings, and means responsive to a condition induced by initial supply of liquid refrigerant to said evaporator operative to de-energize said starting winding.

2. Refrigerating apparatus comprising a pressure equalizing medium circuit, an evaporator in said circuit, means for supplying liquid refrigerant to said evaporator, a motor-driven circulating device included in said circuit, said motor of said circulating device being provided with separate starting and running windings, means responsive to demands for refrigeration operative normally to control the supply of energy to said windings, means adapted to render said control means responsive only to a defrosted condition of said evaporator, and means responsive to the condition of said evaporator and operative to de-energize said starting winding after a short period of energization thereof.

3. Refrigerating apparatus including an evaporator, a pressure equalizing medium circuit including said evaporator, means for supplying liquid refrigerant to said circuit, motor-driven means for propelling fluids through said circuit, starting and running circuits controlling said motor-driven means, means responsive to demand for refrigeration operative to control the supply of energy to said starting and running circuits, means responsive to a discontinuance of circulation in said circuit operative to condition said starting circuit for energization and operative in response to production of refrigeration to de-energize said starting circuit.

4. Absorption refrigerating apparatus comprising an evaporator and an absorber connected to form a pressure equalizing medium circuit, a fan for circulating a pressure equalizing medium through said circuit, a hermetically sealed motor for driving said fan, a low wattage running winding for said motor, a high wattage starting winding for said motor, means for supplying liquid refrigerant to said evaporator, means responsive to demand for refrigeration operative to control the supply of energy to said starting and running windings, and means responsive to a condition of said evaporator adjacent the point at which liquid refrigerant is supplied thereto and operative to control said starting winding.

5. Refrigerating apparatus including a pressure equalizing medium circuit, an evaporator in said circuit, a motor-driven circulator in said circuit, means for supplying liquid refrigerant to said circuit, starting and running windings for said motor, means adapted simultaneously to control the supply of energy to said windings, means controlling the supply of energy to said starting winding, and means for causing said last mentioned means to prevent supply of energy to said starting winding whenever refrigeration is produced in said circuit.

6. Refrigerating apparatus including a pressure equalizing medium circuit, an evaporator and an absorber in said circuit, a generator, means connected to said generator and said evaporator for supplying vapor generated in said generator to said evaporator in liquid phase, a source of heat for said generator, motor-driven means for circulating fluids through said circuits, starting and running windings for said motor, means for controlling the energization of said source of heat and said windings in response to refrigeration demand, and means for controlling the energization of said starting winding without affecting said source of heat.

7. Refrigerating apparatus including a pressure equalizing medium circuit, an evaporator and an absorber in said circuit, a generator, means connected to said generator and said evaporator for supplying vapor generated in said generator to said evaporator in liquid phase, a source of heat for said generator, motor-driven means for circulating fluids through said circuits, starting and running windings for said motor, means for controlling the energization of said source of heat and said windings in response to refrigeration demand, and means for de-energizing said starting winding in response to a change in the thermal condition of a portion of said system induced by the production of refrigerant vapor in said boiler.

8. In a refrigerating system having a fluid circuit therein, a circulating device in said circuit, characterized by the fact that said circulating device is driven by an induction device mounted in a thin walled portion of said circuit having starting and running windings mounted on the outside thereof.

9. Absorption refrigerating apparatus comprising a pressure equalizing medium circuit having an absorber and an evaporator therein, a fan in said circuit for circulating pressure equalizing medium therethrough, an induction rotor for driving said fan mounted in a thin walled shell open to said circuit, starting and running windings for said rotor mounted outside said shell, and means controlling said starting and running windings in accordance with the condition of the system.

10. Absorption refrigerating apparatus comprising an inert gas circuit including an evaporator and an absorber, a solution circuit including a boiler and said absorber, means for supplying refrigerant vapor generated in said boiler to said evaporator in liquid phase, means for heating said boiler, a motor driven circulator in said inert gas circuit having starting and running windings, and means responsive to the thermal condition of a portion of the system for de-energizing said starting winding shortly after energization thereof in response to a change induced in said portion of said system by operation of said circulator.

11. Absorption refrigerating apparatus comprising an inert gas circuit including an evaporator and an absorber, a solution circuit including a boiler and said absorber, means for supplying refrigerant vapor generated in said boiler to said evaporator in liquid phase, means for heating said boiler, a motor driven circulator in said inert gas circuit having starting and running windings, control means for governing the energization of said motor and heating means, and means responsive to the thermal condition of a portion of the system for de-energizing said starting winding shortly after energization thereof by said control means.

12. Absorption refrigerating apparatus comprising an inert gas circuit including an evaporator and an absorber, a solution circuit including a boiler and said absorber, means for supplying refrigerant vapor generated in said boiler to said evaporator in liquid phase, means for heating said boiler, a motor driven circulator in said inert gas circuit having starting and running windings, control means for governing the energization of said motor and heating means, and means responsive to the thermal condition of a portion of the system for de-energizing said starting winding shortly after energization thereof by said control means in response to a change induced in said portion of said system by operation of said circulator.

13. In an absorption refrigerating system of the type involving an evaporator and a motor driven circulator for inert gas having starting and running windings, the combination of control means for energizing and de-energizing said circulator in response to refrigerating demands, and means actuated by a thermal change in a portion of the system as a result of energization of said motor by said control means for de-energizing the starting winding of said motor driven circulator.

14. In combination with a refrigerating apparatus including a fluid circuit, a fluid translating device in said fluid circuit, an electrical motor for operating said fluid translating device and control means for governing the energization of said apparatus, control means responsive to a change in the temperature of a portion of said apparatus which is induced by energization of said apparatus for conditioning said motor for a starting period and for terminating said starting period and for conditioning said motor for normal running operation upon the occurrence of said change in the temperature of said portion of said apparatus.

15. A refrigerating system including a fluid circuit, a fluid circulator in said fluid circuit, an electrical motor for driving said fluid circulator, starting and running circuits for said electrical motor, control means for governing the energization of said system and said starting and running circuits, and means for de-energizing said starting circuit in response to a change in the thermal condition of a portion of the system induced by initiation of operation thereof.

WILLIAM H. KITTO.